United States Patent Office 3,361,790
Patented Jan. 2, 1968

3,361,790
ETHER-LINKED ACIDS AND ESTERS OF
TRIARYLACRYLAMIDES
Robert Edward Allen, Walnut Creek, and Laszlo Ambrus,
Berkeley, Calif., assignors to Cutter Laboratories Inc.,
Berkeley, Calif., a corporation of Delaware
No Drawing. Filed July 2, 1964, Ser. No. 380,087
13 Claims. (Cl. 260—471)

ABSTRACT OF THE DISCLOSURE

Ether-linked acids and esters of triarylacrylamides. The compounds are characterized by gonadotrophic inhibitory and uterotrophic activity, and by herbicidal and insecticidal activity.

---

The present invention relates to derivatives of triarylacrylamides, and is more particularly concerned with ether-linked acids, esters and amides of triarylacrylamides, a method for their preparation, compositions incorporating the novel compounds, and a method of treatment utilizing the active compounds of the invention and compositions containing the same.

The novel compounds of the present invention may be represented by the formula:

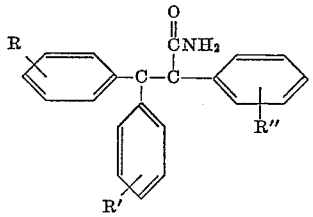

I wherein R is selected from the group consisting of hydrogen, lower-alkyl, lower-alkoxy, halogen, trifluoromethyl, and dilower-alkylamino, and
wherein R' and R" are independently selected from the group consisting of hydrogen, lower-alkyl, lower-alkoxy, halogen, trifluoromethyl, dilower-alkylamino, hydroxy, and

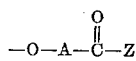

(hereinafter written —O—A—COZ), in which A is lower-alkylene and Z is selected from the group consisting of hydroxy, —OM wherein M is an alkali or alkaline earth metal, lower-alkoxy, and —NR¹R², in which R¹ and R² are independently selected from the group consisting of hydrogen, lower-alkyl, phenyl, and benzyl and, together with the nitrogen atom, pyrrolidino, piperidino, morpholino, piperazino, N-lower-alkyl piperazino, and mono and poly C-lower-alkyl derivatives thereof, at least one of R' and R" being —O—A—COZ.

The preferred compounds are those in which only one of R' and R" is —O—A—COZ, and wherein A has a maximum of three carbon atoms. In this group, those compounds in which R and the other of R' and R" are hydrogen or a parasubstituent are preferred. The compounds of the invention exist as cis or trans geometric isomers, and such isomers are within the scope of the invention as well as the isomeric mixtures. Some of the compounds may also exit as optical isomers, and such optical isomers and racemic mixtures thereof are also within the purview of the invention.

The compounds of the foregoing formula are characterized by gonadotrophic inhibitory and uterotrophic activity, and are accordingly useful in the treatment of conditions involving fertility and sterility problems in both males or females, especially those conditions arising from or subject to influence by female or male hormonal imbalance. The compounds are also useful as herbicides and insecticides.

Throughout the specification and claims, the terms lower-alkyl, lower-alkoxy, lower-alkylene, and dilower-alkylamino refer to the respective groups having a maximum of eight carbon atoms, preferably a maximum of four carbon atoms, in each lower-alkyl group thereof. A "lower-alkylene" group, as used herein, contains a maximum of eight carbon atoms, preferably a maximum of four carbon atoms, and is of straight or branched structure.

The compounds of the present invention are prepared by reacting a phenolic hydroxy-containing triarylacrylamide, preferably in the form of a salt thereof, with an appropriately substituted halide, X—A—COZ, as hereinafter further defined, to form a compound of Formula I.

The hydroxy-containing triarylacrylamide starting material has the following formula:

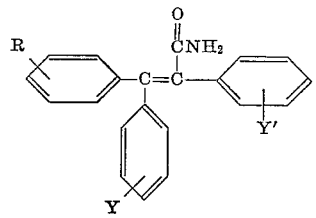

II wherein R is selected from the group consisting of hydrogen, lower-alkyl, lower-alkoxy, halogen, trifluoro-methyl, and dilower-alkylamino, and
wherein Y and Y' are independently selected from the group consisting of hydrogen, lower-alkyl, lower-alkoxy, halogen, trifluoromethyl, dilower-alkylamino, and hydroxy, at least one of Y and Y' being hydroxy.

The hydroxy-containing triarylacrylamide starting materials may be conveniently prepared by demethylation of a corresponding methoxy-substituted triphenylacrylonitrile by means of pyridine hydrochloride, preferably at the reflux temperature for pyridine hydrochloride, or by decomposition of a 2-tetrahydropyranyl ether derivative of the phenol by means of an aqueous acid such as dilute hydrochloric or sulfuric acid or the like. The latter method is preferable, particularly when one desires to obtain a phenolic intermediate where another non-phenolic phenyl group carries an alkoxy substituent. The methyl or tetrahydropyranyl ether intermediates are conveniently prepared by the condensation of a suitably substituted benzophenone with an appropriately substituted phenylacetonitrile. The condensation may be effected in inert solvents such as diethylether, benzene, toluene, dimethyl-formamide, or any combination of these, preferably at their reflux temperatures, using a basic catalyst such as sodium or potassium or lithium amide, hydride, or the metals themselves in a finely divided state in a solvent such as toluent or xylene.

The starting phenolic hydroxy-containing triacrylacrylamides are then prepared by hydrolysis of the corresponding hydroxy-containing triarylacrylonitriles, which may be conveniently effected by refluxing with a strong base such as sodium or potassium hydroxide in a relatively high boiling alcohol containing water, such as a moist amyl alcohol, for a reaction period which may vary from about one to about ten hours.

The compounds of Formula II are preferably reacted, in the form of an alkali or alkaline earth metal salt thereof, with an appropriately substituted halide having the formula X—A—COZ, wherein X is halogen, A is lower-alkylene, and wherein Z is OM wherein M is an alkali or alkaline earth metal, lower-alkoxy, or —NR¹R², wherein $R^1$ and $R^2$ are independently selected from the group consisting of hydrogen, lower-alkyl, phenyl, and benzyl, and together with the nitrogen atom may represent pyrrolidino, piperidino, morpholino, piperazino, N-alkylpiperazino, or mono or poly C-lower-alkyl derivatives thereof. The alkylene radical A may be substituted by X at any suitable position, the particular position being determinative of whether A in the compounds of Formula I is a straight or branched chain alkylene group.

According to one reaction procedure, the preformed phenolate, such as the sodium salt of a compound of Formula II, may be treated with the selected appropriately substituted halide X—A—COZ either in the presence or the absence of an added solvent at a suitable reaction temperature, e.g., usually about 20–150° centigrade, to yield the desired —O—A—COZ substituted product. Alternatively, a mixture of the phenol and the appropriately substituted halide may be treated with a suitable alkali such as sodium methoxide, sodium ethoxide, sodium or potassium or calcium hydroxide, sodium or potassium carbonate, sodium hydride or amide, preferably in the presence of a suitable reaction solvent such as ethanol or other lower alkanol, water, or an inert solvent such as benzene, toluene, xylene, or the like, at an elevated temperature, preferably at or about the boiling point of the solvent or combination of solvents employed. The reaction usually requires a period of several minutes to several hours, depending upon the exact reactants and reaction conditions employed. This procedure produces a metal phenolate in situ, which then condenses during the remaining stage of the reaction with the second reactant X—A—COZ to produce the desired —O—A—COZ substituted product.

In either procedure, the —COZ products in which Z is OM, M being an alkali or alkaline earth metal, may be hydrolyzed to the carboxy group with acid according to standard acidic hydrolysis procedure, or the water-soluble salts such as the potassium and sodium salts may be used as such. As a further procedural variation the acid or acid salt may be produced by standard saponification of a lower-alkyl ester —O—A—COZ wherein Z is lower-alkoxy, e.g., ethoxy, as with aqueous alcoholic sodium or potassium hydroxide, using for example hot ethanol or amyl alcohol. The procedure gives the acid salt which may again be converted to the free acid by standard acid hydrolysis procedure, if desired.

When a starting material of Formula II is used, in which both Y and Y' are alkali metal phenolate groups, and a smaller amount of X—A—COZ is used than that required to react completely with both phenolate groups, either R' or R'' of the final product of Formula I may be a hydroxy group. When an excess of the second reactant is employed, both phenolate groups are converted to the desired —O—A—COZ substituent.

The starting phenolic hydroxy-containing triarylacrylamides, most of which are new compounds, are prepared as follows:

PREPARATION 1.—3,3-DIPHENYL-2-(4-HYDROXYPHENYL)ACRYLAMIDE

One hundred ten grams (0.61 mole) of benzophenone and 40 grams (0.9 mole) of sodium hydride dispersion (53 percent in mineral oil) are suspended in 300 milliliters of dry benzene. To this stirred suspension, heated to reflux, is added a solution of 90 grams (0.61 mole) of 4-methoxyphenylacetonitrile in 200 milliliters of dry benzene over a one-hour period. The reaction mixture is refluxed for four additional hours at the end of which time hydrogen evolution has practically ceased. The reaction mixture is kept at room temperature for sixteen hours and the excess hydride cautiously decomposed with water. The organic layer is washed several times with water, dried over anhydrous magnesium sulfate, filtered, and the solvent removed under reduced pressure. The residue is taken up in a minimum amount of hot ethanol. 3,3-diphenyl-2-(4-methoxyphenyl)-acrylonitrile is obtained as yellow needles melting at about 148–149° centigrade.

Ninety grams (0.29 mole) of 3,3-diphenyl-2-(4-methoxyphenyl)acrylonitrile and 126 grams (1.1 moles) of pyridine hydrochloride are refluxed for thirty minutes. The reaction mixture is cooled and diluted with water. The crude material is filtered and dissolved in one liter of five percent warm sodium hydroxide solution, the solution is filtered, and the filtrate is acidified with one liter of five percent hydrochloric acid. The precipitate is filtered and dissolved in a minimum amount of hot ethanol. 3,3-diphenyl-2-(4-hydroxyphenyl)acrylonitrile is obtained as yellow crystals melting at about 229–230° centigrade.

*Analysis.*—Calculated for $C_{21}H_{15}NO$: C, 84.80; H, 5.08; N, 4.71. Found: C, 85.00; H, 4.61; N, 4.57.

This compound can also be obtained by acid decomposition of 3,3 - diphenyl - 2 - [4-(tetrahydropyran-2-yloxy)phenyl]-acrylonitrile which is prepared by the condensation of benzophenone with 4-(tetrahydropyran-2-yloxy)phenylacetonitrile (procedure of Preparation 3) to give 3,3 - diphenyl - 2 - [4-(tetrahydropyran-2-yloxy)phenyl] acrylonitrile, melting at about 143–144° centigrade. The compound has uterotrophic and gonadotrophic inhibitory activities.

*Analysis.*—Calculated for $C_{26}H_{23}NO_2$: C, 81.86; H, 6.08; N, 3.67. Found: C, 81.60; H, 6.08; N, 3.69.

A mixture of 29.7 grams (0.10 mole) of 3,3-diphenyl-2-(4-hydroxyphenyl)acrylonitrile and 120 grams (3.0 moles) of sodium hydroxide in 400 grams of isoamyl alcohol is refluxed for three hours. The mixture is cooled, a solid separates and is collected on a filter, dissolved in about 500 milliliters of warm water and re-precipitated by diluting with excess ten percent hydrochloric acid. The collected precipitate is washed with water and crystallized from a minimum of hot (100° centigrade) acetic acid to give white needles of 3,3-diphenyl-2-(4-hydroxyphenyl)acrylamide, melting at about 284–285° centigrade.

*Analysis.*—Calculated for $C_{21}H_{17}NO_2$: C, 80.00; H, 5.43; N, 4.44. Found: C, 79.72; H, 5.55; N, 4.55.

PREPARATION 2.—2-(4-HYDROXYPHENYL)-3,3-BIS(4-TOLYL)-ACRYLAMIDE

By the procedure described in Preparation 1, 4,4'-dimethylbenzophenone is allowed to react with 4-methoxyphenylacetonitrile to give 2-(4-methoxyphenyl)-3,3-bis(4-tolyl)acrylonitrile, yellow crystals when crystallized from isopropanol, melting at about 146–148° centigrade.

*Analysis.*—Calculated for $C_{24}H_{21}NO$: C, 84.95; H, 6.23; N, 4.12. Found: C, 84.52; H, 6.76; N, 3.91.

By treating 2-(4-methoxyphenyl)-3,3-bis(4-tolyl)-acrylonitrile with pyridine hydrochloride according to the procedure of Preparation 1, 2-(4-hydroxyphenyl-3,3-bis(4-tolyl)acrylonitrile is obtained as yellow crystals melting at about 229–230° centigrade.

*Analysis.*—Calculated for $C_{23}H_{19}NO$: C, 84.90; H, 5.88; N, 4.31. Found: 84.74; H, 5.69; N, 4.70.

By the procedure described in Preparation 1, a mixture of 2-(4-hydroxyphenyl)-3,3-bis(4-tolyl)acrylonitrile and sodium hydroxide in isoamyl alcohol is refluxed for about three hours, cooled, and the product filtered, converted to the phenol by acidification, and recrystallized, to give white needles of 2-(4-hydroxyphenyl)-3,3-bis(4-tolyl)-acrylamide, melting at about 254–255° centigrade.

*Analysis.*—Calculated for $C_{23}H_{21}NO_2$: C, 80.44; H, 6.16; N, 4.08. Found: C, 80.23; H, 6.11; N, 4.15.

PREPARATION 3.—2-(4-HYDROXYPHENYL)-3,3-BIS(4-METHOXYPHENYL)-ACRYLAMIDE

A mixture of 160 grams (1.2 moles) of 4-hydroxyphenylacetonitrile and 103 grams (1.3 moles) of dihydropyran is dissolved in 500 milliliters of dry benzene and two milliliters of concentrated hydrochloric acid added. The reaction mixture is refluxed for four hours and kept at room temperature for sixteen hours. The organic layer is washed several times with 200-milliliter portions of five percent sodium hydroxide solution and with water until neutral. The organic layer is dried over magnesium sulfate, filtered, and the solvent removed under reduced pressure. The oily residue is crystallized from an ether-pentane (1 to 3) mixture to give 4-(tetrahydropyran-2-yloxy)phenylacetonitrile, yellow crystals melting at about 64–66° centigrade.

To a refluxing suspension of 70 grams (1.8 moles) of sodium amide and 150 milliliters of benzene is added a solution of 154 grams (0.72 mole) of 4-(tetrahydropyran-2-yloxy)phenylacetonitrile in 500 milliliters of dry benzene over a three-hour period. The reaction mixture is refluxed for one additional hour at the end of which time the ammonia evolution has practically ceased. With stirring, a hot solution of 174 grams (0.72 mole) of 4,4′-dimethoxybenzophenone in two liters of benzene is added. After two additional hours at reflux, the reaction mixture is kept at room temperature for sixteen hours and the excess sodium amide is cautiously decomposed with water. The organic layer is washed several times with water, dried over anhydrous magnesium sulfate, filtered, and the solvent removed under reduced pressure. The oily residue is triturated with a warm mixture of one liter ethanol and 500 milliliters of petroleum ether (B.P. 60–68° centigrade) from which a yellow solid, melting at about 202–206° centigrade, is obtained by evaporation. This solid is dissolved in 500 milliliters of boiling glacial acetic acid containing three drops of concentrated sulfuric acid and slowly diluted with water until yellow needles separate (about 800 milliliters of water is needed), 2-(4-hydroxyphenyl)-3,3 - bis(4-methoxyphenyl)acrylonitrile is obtained as yellow crystals melting at about 217–219° centigrade.

*Analysis.*—Calculated for $C_{23}H_{19}NO_3$: C, 77.29; H, 5.36; N, 3.92. Found: C, 77.38; H, 5.34; N, 3.81.

By the procedure described in Preparation 1, a mixture of 2-(4-hydroxyphenyl)-3,3-bis(4-methoxyphenyl)acrylonitrile and sodium hydroxide in isoamyl alcohol is refluxed for about three hours, cooled, and the product filtered, converted to the phenol by acidification, and recrystallized, to give 2-(4-hydroxyphenyl)3,3-bis(4-methoxyphenyl)acrylamide.

PREPARATION 4.—3,3-BIS(4-CHLOROPHENYL(-2-(4-HYDROXYPHENYL)-ACRYLAMIDE

By the procedure described in Preparation 3, 4,4′-dichlorobenzophenone is allowed to react with 4-(tetrahydropyran-2-yloxy)phenylacetonitrile to give 3,3-bis(4-chlorophenyl)-2-(4 - hydroxyphenyl)acrylonitrile, yellow crystals when crystallized from acetic acid, melting at about 252–254° centigrade.

*Analysis.*—Calculated for $C_{21}H_{13}Cl_2NO$: C, 68.88; H, 3.58; N, 3.82. Found: C, 68.80; H, 3.58; N, 3.85.

By the procedure described in Preparation 1, a mixture of 3,3-bis(4-chlorophenyl)-2-(4-hydroxyphenyl)acrylonitrile and sodium hydroxide in isomayl alcohol is refluxed for about three hours, cooled, and the product filtered, converted to the phenol by acidification, and recrystallized, to give 3,3-bis(4-chlorophenyl)-2-(4-hydroxyphenyl)acrylamide.

PREPARATION 5.—2,3-DIPHENYL-3-(4-HYDROXYPHENYL)ACRYLAMIDE

A mixture of 100 grams (0.505 mole) of 4-hydroxybenzophenone and 50 grams (0.595 mole) of dihydropyran is dissolved in 500 milliliters of warm dry benzene and two milliliters of concentrated hydrochloric acid is added. The reaction mixture is refluxed for four hours and then kept at room temperature for sixteen hours. The organic layer is washed several times with 200-milliliter portions of five percent sodium hydroxide solution and with water until neutral. The organic layer is dried over magnesium sulfate, filtered, and the solvent removed under reduced pressure to give a yellow oil, which is dissolved in pentane to give white crystals of 4-(tetrahydropyran-2-yloxy)-benzophenone, melting at about 49–51° centigrade.

*Analysis.*—Calculated for $C_{18}H_{18}O_3$: C, 76.60; H, 6.43. Found: C, 76.65; H, 6.44.

To a refluxing suspension of eight grams (0.205 mole) of sodium amide in 200 milliliters of diethyl ether is added a solution of 11.4 grams (0.1 mole) of phenylacetonitrile in 200 milliliters of diethyl ether over a two-hour period. The reaction mixture is refluxed for one additional hour, at the end of which time the ammonia evolution has practically ceased. With stirring, a solution of 28 grams (0.1 mole) of 4-(tetrahydropyran-2-yloxy)benzophenone in 100 milliliters of diethyl ether is added. After two additional hours' reflux, the reaction mixture is kept at room temperature for sixteen hours and the excess sodium amide cautiously decomposed with water. The organic layer is washed several times with water, dried over anhydrous magnesium sulfate, filtered and the solvent removed under reduced pressure. The residual oil is dissolved in methanol from which white crystals of 2,3-diphenyl - 3-[4-(tetrahydropyran-2-yloxy)phenyl]acrylonitrile separate, melting over a range from 118–144° centigrade. The compound has uterotrophic and gonadotrophic inhibitory activities.

*Analysis.*—Calculated for $C_{26}H_{23}NO_2$: C, 81.86; H, 6.08; N, 3.67. Found: C, 82.15; H, 6.25; N, 3.87.

These crystals are dissolved in 100 milliliters of boiling glacial acetic acid containing three drops of concentrated sulfuric acid and slowly diluted with water until yellow needles separate (about 250 milliliters of water is needed). 2,3-diphenyl-3-(4-hydroxyphenyl)acrylonitrile is obtained as yellowish crystals melting at about 207–208° centigrade.

By the procedure described in Preparation 1, a mixture of 2,3-diphenyl-3-(4-hydroxyphenyl)acrylonitrile and sodium hydroxide in isoamyl alcohol is refluxed for about three hours, cooled, and the product filtered, converted to the phenol by acidification, and recrystallized, to give 2,3-diphenyl-3-(4-hydroxyphenyl)acrylamide.

PREPARATION 6.—3-(4-HYDROXYPHENYL)-2-(4-METHOXYPHENYL)-3-PHENYLACRYLAMIDE

By the procedure described in Preparation 5, 4-(tetrahydropyran-2-yloxy)benzophenone is allowed to react with 4-methoxyphenylacetonitrile to give 3-(4-hydroxyphenyl) - 2 - (4 - methoxyphenyl)-3-phenylacrylonitrile, yellowish crystals when crystallized from acetic acid, melting at about 189–191° centigrade.

*Anaylsis.*—Calculated for $C_{22}H_{17}NO_2$: C, 80.73; H, 5.24; N, 4.28. Found: C, 80.10; H, 5.32; N, 4.46.

By the procedure described in Preparation 1, a mixture of 3 - (4-hydroxyphenyl)-2-(4-methoxyphenyl)-3-phenylacrylonitrile and sodium hydroxide in isoamyl alcohol is refluxed for about three hours, cooled, and the product filtered, converted to the phenol by acidification, and recrystallized, to give 3-(4-hydroxyphenyl)-2-(4-methoxyphenyl)-3-phenylacrylamide.

PREPARATION 7.—2-(4-CHLOROPHENYL)-3-(4-HYDROXYPHENYL)-3-PHENYLACRYLAMIDE

By the procedure described in Preparation 5, 4-(tetrahydropyran-2-yloxy)-benzophenone is allowed to react with 4-chlorophenylacetonitrile. The ether is removed and the reaction mixture is extracted with hexane from which a crop of crystals separate. These are recrystallized from ethanol to give one of the geometric forms of 2-(4-chlorophenyl) - 3-phenyl-3-[4-(tetrahydropyran-2-yloxy)-phenyl]-acrylonitrile, melting at about 183–184° centigrade.

*Analysis.*—Calculated for $C_{26}H_{22}ClNO_2$: C, 75.10; H, 5.33; N, 3.37. Found: C, 75.00; H, 5.42; N, 3.43.

The oily residue from the above hexane mother liquor and the crystals of tetrahydropyranyl derivative are treated separately in glacial acetic acid to give the two geometric forms of 2-(4-chlorophenyl)-3-(4-hydroxyphenyl)-3-phenylacrylonitrile, melting at about 175–177° and 187–189° centigrade, respectively.

*Analysis.*—Calculated for $C_{21}H_{14}ClNO$: C, 76.03; H, 4.25; N, 4.22. Found, respectively: C, 76.18, 76.07; H, 4.29, 4.62; N, 4.11, 4.12.

By the procedure described in Preparation 1, a mixture of 2 - (4 - chlorophenyl)-3-(4-hydroxyphenyl)-3-phenylacrylonitrile and sodium hydroxide in isoamyl alcohol is refluxed for about three hours, cooled, and the product filtered, converted to the phenol by acidification, and recrystallized, to give 2-(4-chlorophenyl)-3-(4-hydroxyphenyl)-3-phenylacrylamide.

PREPARATION 8.—3,3-BIS(4-DIMETHYLAMINOPHENYL)-2-(4-HYDROXYPHENYL)ACRYLAMIDE

By the procedure described in Preparation 3, 4,4'-bis(dimethylamino)benzophenone is allowed to react with 4-(tetrahydropyran-2-yloxy)phenylacetonitrile to give 3,3-bis (4 - dimethylaminophenyl) - 2-[4-(tetrahydropyran-2-yloxy)phenyl]acrylonitrile, yellow crystals when crystallized from dimethylformamide-ethanol (1:20), melting at about 189–191° centigrade.

*Analysis.*—Calculated for $C_{30}H_{33}N_3O_2$: C, 77.05; H, 7.11; N, 8.99. Found: C, 76.82; H, 7.23; N, 8.88.

The tetrahydropyranyl derivative dissolved in dimethylformamide is decomposed with excess 30 percent sulfuric acid and, upon neutralization with diethylamine, orange crystals of 3,3-bis(4-dimethylaminophenyl)-2-(4-hydroxyphenol)acrylonitrile are obtained, melting at about 240–242° centigrade.

*Analysis.*—Calculated for $C_{25}H_{25}N_3O$: C, 78.29; H, 6.57; N, 10.95. Found: C, 77.80; H, 6.76; N, 10.78.

By the procedure described in Preparation 1, a mixture of 3,3 - bis(4 - dimethylaminophenyl)-2-(4-hydroxyphenyl)acrylonitrile and sodium hydroxide in isoamyl alcohol is refluxed for about three hours, cooled, and the product filtered, converted to the phenol by acidification, and recrystallized, to give 3,3-bis(4-dimethylaminophenyl)-2-(4-hydroxyphenyl)acrylamide.

PREPARATION 9.—2,3-BIS(4-HYDROXYPHENYL)-3-PHENYLACRYLAMIDE

By the procedure described in Preparation 5, 4-(tetrahydropyran-2-yloxy)benzophenone is allowed to react with 4-(tetrahydropyran-2-yloxy)phenyl acetonitrile. The ether is removed and the reaction mixture is dissolved in ethanol, from which a crop of crystals separate. These are recrystallized from dimethylformamide to give one of the geometric forms of 3-phenyl-2,3-bis[4-(tetrahydropyran-2-yloxy)phenyl]-acrylonitrile, melting at about 189–191° centigrade.

*Analysis.*—Calculated for $C_{31}H_{31}NO_4$: C, 77.31; H, 6.49; N, 2.91. Found: C, 76.75; H, 6.68; N, 3.28.

The oily residue from the above ethanol mother liquor and the crystals of the tetrahydropyranyl derivative are treated separately in glacial acetic acid to give the two geometric forms of 2,3-bis(4-hydroxyphenyl)-3-phenylacrylonitrile, melting at about 263–264° and 261–262° centigrade, respectively.

*Analysis.*—Calculated for $C_{21}H_{15}NO_2$: C, 80.51; H, 4.83; N, 4.47. Found, respectively: C, 80.20, 80.56; H, 4.96, 4.98; N, 4.31, 4.22.

By the procedure described in Preparation 1, a mixture of 2,3-bis(4-hydroxyphenyl) - 3 - phenylacrylonitrile and sodium hyroxide in isoamyl alcohol is refluxed for about three hours, cooled and the product filtered, converted to the phenol by acidification, and recrystallized, to give 2,3-bis(4-hydroxyphenyl)-3-phenylacrylamide.

PREPARATION 10.—2,3-DIPHENYL-3-(2-HYDROXYPHENYL)ACRYLAMIDE

Using 2-hydroxybenzophenone in place of 4-hydroxybenzophenone in the procedure of Preparation 5, 2,3-diphenyl-3-(2-hydroxyphenyl)acrylonitrile is obtained as yellow crystals.

By the procedure described in Preparation 1, a mixture of 2,3-diphenyl-3-(2-hydroxyphenyl)acrylonitrile and sodium hydroxide in isoamyl alcohol is refluxed for about three hours, cooled, and the product filtered, converted to the phenol by acidification, and recrystallized, to give 2,3-diphenyl-3-(2-hydroxyphenyl)acrylamide.

PREPARATION 11.—2 - (4 - HYDROXYPHENYL)-3,3 - BIS(4 - TRIFLUOROMETHYLPHENYL) ACRYLAMIDE

By the procedure described in Preparation 1, 4,4'-bis(trifluoromethyl)benzophenone is allowed to react with 4-methoxyphenylacetonitrile to give 2-(4-methoxyphenyl)-3,3-bis(4-trifluoromethylphenyl)acrylonitrile.

By treating 2-(4-methoxyphenyl) - 3,3 - bis(4-trifluoromethylphenyl)acrylonitrile with pyridine hydrochloride according to the procedure of Preparation 1, 2-(4-hydroxyphenyl)-3,3-bis(4-trifluoromethyl)acrylonitrile is obtained.

By the procedure described in Preparation 1, a mixture of 2-(4-hydroxyphenyl)-3,3-bis(4-trifluoromethylphenyl)-acrylonitrile and sodium hydroxide in isoamyl alcohol is refluxed for about three hours, cooled, and the product filtered, converted to the phenol by acidification, and recrystallized, to give 2-(4-hydroxyphenyl)-3,3-bis(4-trifluoromethylphenyl)acrylamide.

Where the foregoing preparations produce a compound having a methyl or other lower-alkyl group, it is to be understood that compounds containing other lower-alkyl groups of straight or branched nature and containing up to eight carbon atoms inclusive, such as methyl, ethyl, propyl, isopropyl, butyl, sec.-butyl, t.-butyl, amyl, isoamyl, hexyl, heptyl, and octyl, are prepared in the same manner by substitution in the process of the appropriate different lower-alkyl starting material. Likewise, where chloro or other halogen atom is present, although chlorine is preferred, further halogen compounds including iodo, bromo, chloro, and fluoro compounds are prepared starting from the appropriate halogenated starting material.

Similarly, where methoxy or other lower-alkoxy group is present, compounds having other lower-alkoxy groups containing various lower-alkyl groups having up to eight carbon atoms inclusive are prepared in the same manner from the appropriate different lower-alkoxy starting material. Moreover when one dilower-alkylamino group, such as the dimethylamino group, is present in a compound, other dilower-alkylamino compounds are prepared in the same manner starting only with the selected different dilower-alkylamino compound. In the same manner, ortho and meta substituted compounds are produced instead of the para by utilizing the selected ortho or meta substituted starting compound. Similarly, other molecular changes are readily made.

The following examples are given by way of illustration only and are not to be construed as limiting.

*Example 1.—4[(1-carbamoyl-2,2-diphenylvinyl) phenoxy]acetic acid*

A mixture of 15.5 grams (0.05 mole) of 3,3-diphenyl-2-(4-hydroxyphenyl)acrylamide and 2.7 grams (0.05 mole) of sodium methoxide in 100 milliliters of n-butanol is stirred and brought to reflux. A suspension of 8.1 grams (0.07 mole) of sodium chloroacetate in twenty milliliters of n-butanol is added over a period of thirty minutes and refluxing is continued for four additional hours. The solvent is removed under reduced pressure, the residue is taken up in 400 milliliters of water and acidified with 40 milliliters of ten percent hydrochloric acid. The precipitated product is collected, dissolved in a minimum of hot (100°) glacial acetic acid and hot water is added to the point of cloudiness. [4-(1-carbamoyl-2,2-diphenylvinyl) phenoxy]acetic acid is obtained as pale yellow crystals, melting at about 191–192° centigrade. The product exhibits uterotrophic, gonadotrophic inhibitory and myotrophic activities.

*Analysis.*—Calculated for $C_{23}H_{19}NO_4$: C, 74.00; H, 5.12; N, 3.76. Found: C, 73.95; H, 5.17; N, 3.60.

*Example 2.—Ethyl {4-[1-carbamoyl-2,2-bis(4-tolyl) vinyl]phenoxy}acetate*

A mixture of nine grams (0.0262 mole) of 2-(4-hydroxyphenyl)-3,3-bis(4-tolyl)acrylamide and 1.42 grams (0.026 mole) of sodium methoxide in 200 milliliters of ethanol is stirred and heated to reflux. Seven grams (0.043 mole) of ethyl bromoacetate is added over a period of thirty minutes and refluxing is continued for two hours. The hot reaction mixture is filtered and, on cooling, ethyl {4-[1-carbamoyl-2,2-bis(4-tolyl)vinyl]phenoxy} acetate is obtained as white needles, melting at about 130–131° centigrade. The product exhibits gonadotrophic inhibitory activity.

*Analysis.*—Calculated for $C_{27}H_{27}NO_4$: C, 75.50; H, 6.34; N, 3.26. Found: C, 75.45; H, 6.16; N, 3.41.

*Example 3.—Ethyl [4-(2-carbamoyl-1,2-diphenylvinyl)phenoxy]acetate*

By the procedure described in Example 2, 2,3-diphenyl-3-(4-hydroxyphenyl)acrylamide is allowed to react with ethyl bromoacetate to give ethyl [4-(2-carbamoyl-1,2-diphenylvinyl)phenoxyl]acetate.

*Example 4.—[4-(2-carbamoyl-1,2-diphenylvinyl)phenoxy]acetic acid*

To a solution of ten grams (0.025 mole) of ethyl [4-(2-carbamoyl-1,2-diphenylvinyl)phenoxyl]acetate in 100 milliliters of hot ethanol is added forty milliliters of ten percent sodium hydroxide over a period of fifteen minutes. The mixture is kept on the steam bath for another thirty minutes, diluted with sixty milliliters of water and the ethanol removed at reduced pressure. The aqueous mixture is acidified with ten percent hydrochloric acid, the precipitate collected, dissolved in a minimum of hot (100°) glacial acetic acid, and diluted with hot water until cloudy. Crystalline [4-(2-carbamoyl-1,2-diphenylvinyl)phenoxy]acetic acid separates from this solution.

*Example 5.—{4-[1-carbamoyl-2,2-bis(4-tolyl)vinyl]phenoxy}acetic acid*

By the procedure of Example 1, 2-(4-hydroxyphenyl)-3,3-bis(4-tolyl)acrylamide is allowed to react with sodium chloroacetate to give {4-[1-carbamoyl-2,2-bis(4-tolyl)vinyl]phenoxy}acetic acid, M.P. 264–265° centigrade.

*Analysis.*—Calculated for $C_{25}H_{23}NO_4$: C, 74.80; H, 5.77; N, 3.49. Found: C, 74.63; H, 5.62; N, 3.68.

*Example 6.—Ethyl{4-[1-carbamoyl-2,2-bis(4-dimethylaminophenyl)vinyl]phenoxy}acetate*

By the procedure of Example 2, 3,3-bis(4-dimethylaminophenyl)-2-(4-hydroxyphenyl)acrylamide is allowed to react with ethyl bromoacetate to give ethyl {4-[1-carbamoyl-2,2-bis(4-dimethylaminophenyl)vinyl]phenoxy}-acetate.

*Example 7.—{4-[1-carbamoyl-2,2-bis(4-dimethylaminophenyl)vinyl]phenoxy}acetic acid*

By the procedure of Example 4, ethyl 4-[1-carbamoyl-2,2-bis(4-dimethylaminophenyl)vinyl]phenoxy acetate is hydrolyzed with sodium hydroxide and the product acidified to give {4-[1-carbamoyl-2,2-bis(4-dimethylaminophenyl)vinyl]phenoxy}acetic acid.

*Example 8.—Ethyl {4-[1-carbamoyl-2,2-bis(4-chlorophenyl)vinyl]phenoxy}acetate*

By the procedure of Example 2, 3,3-bis(4-chlorophenyl)-2-(4-hydroxyphenyl)acrylamide is allowed to react with ethyl bromoacetate to give ethyl {4-[1-carbamoyl-2,2-bis(4-chlorophenyl)vinyl]phenoxy}acetate.

*Example 9.—Ethyl {4-[1-carbamoyl-2,2-bis(4-methoxyphenyl)vinyl]phenoxy}acetate*

By the procedure of Example 2, 2-(4-hydroxyphenyl)-3,3-bis(4-methoxyphenyl)acrylamide is allowed to react with ethyl bromoacetate to give ethyl {4-[1-carbamoyl-2,2-bis(4-methoxyphenyl)vinyl]phenoxy}acetate.

*Example 10.—{4-[1-carbamoyl-2,2-bis(4-methoxyphenyl)vinyl]phenoxy}acetic acid*

By the procedure of Example 4, ethyl {4-[1-carbamoyl-2,2-bis(4-methoxyphenyl)vinyl]phenoxy}acetate is hydrolyzed with sodium hydroxide and the product acidified to give {4-[1-carbamoyl-2,2-bis(4-methoxyphenyl)vinyl]phenoxy}acetic acid.

*Example 11.—4-[4-(1-carbamoyl-2,2-diphenylvinyl)phenoxy]butyric acid*

By the procedure of Example 1, 3,3-diphenyl-2-(4-hydroxyphenyl)acrylamide is allowed to react with sodium 4-chlorobutyrate to give 4-[4-(1-carbamoyl-2,2-diphenylvinyl)phenoxy]butyric acid.

*Example 12.—Ethyl 2-[4-(1-carbamoyl-2,2-diphenylvinyl)phenoxy]butyrate*

By the procedure of Example 2, 3,3-diphenyl-2-(4-hydroxyphenyl)acrylamide is allowed to react with ethyl 2-bromobutyrate to give ethyl 2-[4-(1-carbamoyl-2,2-diphenylvinyl)phenoxy]butyrate.

*Example 13.—2-[4-(1-carbamoyl-2,2-diphenylvinyl)phenoxy]butyric acid*

By the procedure of Example 4, ethyl 2-[4-(1-carbamoyl-2,2-diphenylvinyl)phenoxy]butyrate is hydrolyzed with sodium hydroxide and the product acidified to give 2-[4-(1-carbamoyl-2,2-diphenylvinyl)phenoxy]-butyric acid.

*Example 14.—Ethyl {4-[2-carbamoyl-2-(4-methoxyphenyl)-1-phenylvinyl]phenoxy}acetate*

By the procedure of Example 2, 3-(4-hydroxyphenyl)-2-(4-methoxyphenyl)-3-phenylacrylamide is allowed to react with ethyl bromoacetate to give ethyl {4-[2-carbamoyl - 2 - (4-methoxyphenyl)-1-phenylvinyl]phenoxy} acetate.

*Example 15.—{4-[2-carbamoyl-2-(4-methoxyphenyl)-1-phenylvinyl]phenoxy}acetic acid*

By the procedure of Example 4, ethyl {4-[2-carbamoyl-2-(4-methoxyphenyl)-1-phenylvinyl]phenoxy}acetate is hydrolyzed with sodium hydroxide and the product acidified to give {4-[2-carbamoyl - 2 - (4-methoxyphenyl)-1-phenylvinyl]phenoxy}acetic acid.

*Example 16.—Ethyl {4-[2-carbamoyl-2-(4-chlorophenyl)-1-phenylvinyl]phenoxy}acetate*

By the procedure of Example 2, 2-(4-chlorophenyl)-3-(4-hydroxyphenyl)-3-phenylacrylamide is allowed to react with ethyl bromoacetate to give ethyl {4-[2-carbamoyl - 2 - (4 - chlorophenyl)-1-phenylvinyl]phenoxy} acetate.

*Example 17.—2,3-bis(4-carbethoxymethoxyphenyl)-3-phenylacrylamide*

By the procedure described in Example 2, fifteen parts of 2,3-bis(4-hydroxyphenyl)-3-phenylacrylamide is first treated with five parts of sodium methoxide, then followed with fifteen parts of ethyl bromoacetate, to give 2,3-bis(4-carbethoxymethoxyphenyl)-3-phenylacrylamide.

*Example 18.—2,3-bis(4-carboxymethoxyphenyl)-3-phenylacrylamide*

By the procedure of Example 4, 2,3-bis(4-carbethoxymethoxyphenyl)-3-phenylacrylamide is hydrolyzed with sodium hydroxide and the product acidified to give 2,3-bis(4-carboxymethoxyphenyl)-3-phenylacrylamide.

*Example 19.—Ethyl [2-(2-carbamoyl-1,2-diphenylvinyl)-phenoxy]acetate*

By the procedure of Example 2, 2,3-diphenyl-3-(2-hydroxyphenyl)acrylamide is allowed to react with ethyl bromoacetate to give ethyl [2-(2-carbamoyl-1,2-diphenylvinyl)phenoxy]acetate.

*Example 20.—[2-(2-carbamoyl-1,2-diphenylvinyl) phenoxy]acetic acid*

By the procedure of Example 4, ethyl [2-(2-carbamoyl-1,2-diphenylvinyl)phenoxy]acetate is hydrolyzed with sodium hydroxide and the product acidified to give [2-(2-carbamoyl-1,2-diphenylvinyl)phenoxy]acetic acid.

*Example 21.—Ethyl 4-[1-carbamoyl-2,2-bis(4-trifluoromethyl)vinyl]phenoxy acetate*

By the procedure described in Example 2, a mixture of 2 - (4 - hydroxyphenyl) - 3,3 - bis(4 - trifluoromethylphenyl)acrylamide and sodium methoxide in ethanol is stirred and heated to reflux. Ethyl bromoacetate is added and refluxing is continued. The hot reaction mixture is filtered and, on cooling, ethyl 4-[1-carbamoyl-2,2-bis(4-trifluoromethyl)vinyl]phenoxy acetate is obtained.

Although in this example both R and R′, as designated in Formula I above, are trifluoromethyl, compounds wherein only one, or any other combination of two of R, R′ and R″ are trifluoromethyl, are produced from the corresponding hydroxy-containing starting material.

Where the foregoing examples produce a compound having a methyl or other lower-alkyl group, it is to be understood that compounds containing other lower-alkyl groups of straight or branched nature and containing up to eight carbon atoms inclusive, such as methyl, ethyl, propyl, isopropyl, butyl, sec.-butyl t.-butyl, amyl, isoamyl, hexyl, heptyl, and octyl, are prepared in the same manner by substitution in the process of the appropriate different lower-alkyl starting material. Lower-alkylene groups in the compounds thus produced may be varied in the same manner, and may be, for example, ethylene, propylene, butylene, isobutylene, or the like. Likewise, where chloro or other halogen atom is present, although chlorine is preferred, further halogen compounds including iodo, bromo, chloro, and fluoro compounds are prepared starting from the appropriate halogenated starting material. Similarly, where methoxy or other lower-alkoxy group is present, other compounds having lower-alkoxy groups containing various lower-alkyl groups having up to eight carbon atoms inclusive are prepared in the same manner from the appropriate different lower-alkoxy starting material. Moreover, when one dilower-alkylamino group, such as the dimethylamino group, is present in a compound, other dilower-alkylamino compounds are prepared in the same manner starting only with the selected different dilower-alkylamino compound. In the same manner, ortho and meta substituted compounds are produced instead of the para by utilizing the selected ortho or meta substituted starting compound. Similarly, other molecular changes within the scope of the invention are readily made.

The compounds of the invention are generally characterized by the pharmacological activity hereinbefore stated, making them useful in counteracting certain physiological abnormalities in a living animal body. Effective quantities of the pharmacologically active compounds of the invention may be administered to a living animal body in any one of various ways, for example, orally as in capsules or tablets, parenterally in the form of sterile solutions, suspensions, or by pellet implantation, and in some cases intravenously in the form of sterile solutions. Other modes of administration are cutaneously, subcutaneously, buccally, intramuscularly, and intraperitoneally.

Pharmaceutical formulations are usually prepared from a predetermined quantity of one or more of the compounds of the invention, preferably in solid form. Such formulations may take the form of powders, elixirs, solutions, pills, capsules, pellets, or tablets, with or without, but preferably with, any one of a large variety of pharmaceutically acceptable vehicles or carriers. When in admixture with a pharmaceutical vehicle or carrier, the active ingredient usually comprises from about 0.01 to about 75 percent, normally from about 0.05 to about 15 percent, by weight of the composition. Carriers such as starch, sugar, talc, commonly used synthetic and natural gums, water, and the like, may be used in such formulations. Binders such as gelatin, and lubricants such as sodium stearate, may be used to form tablets. Disintegrating agents such as sodium bicarbonate may also be included in tablets.

Although relatively small quantities of the active materials of the invention, even as low as 0.1 milligram, may be used in cases of administration to subjects having a relatively low body weight, unit dosages are usually five milligrams or above and preferably twenty-five, fifty, or one-hundred milligrams or even higher, depending of course upon the subject treated and the particular result desired. Broader ranges appear to be one to 5.00 milligrams per unit dose. The active agents of the invention may be combined for administration with other pharmacologically active agents, such as analgesics, sedatives, tranquilizers, adrenal or progestational or estrogenic steroids or hormones, or the like, or with buffers, antacids or the like, and the proportion of the active agent or agents in the compositions may be varied widely. It is only necessary that the active ingredient of the invention constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to well-established principles.

It is to be understood that the invention is not to be limited to the exact details of operation or exact compounds, compositions, or procedures shown and described, as obvious modifications and equivalents will be apparent to one skilled in the art, and the invention is therefore to be limited only by the scope of the appended claims.

We claim:

1. A triarylacrylamide having the formula:

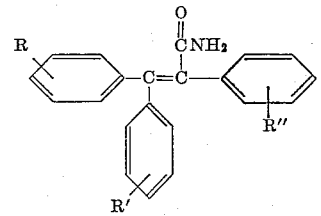

wherein R is selected from the group consisting of hydrogen, lower-alkyl, lower-alkoxy, halogen, trifluoromethyl, and dilower-alkylamino, and wherein R′ and R″ are independently selected from the group consisting of hydrogen, lower-alkyl, lower-alkoxy, halogen, trifluoromethyl, dilower-alkylamino, hydroxy, and —O—A—COZ, in which A is lower-alkylene and Z is selected from the group consisting of (1) hydroxy, (2) OM wherein M is selected from the group consisting of alkali and alkaline earth metals, (3) lower-alkoxy, at least one of R′ and R″ being —O—A—COZ.

2. (1 - carbamoyl - 2,2 - diphenylvinyl)phenoxy lower-alkanoic acid.

3. Alkali metal salt of a compound of claim 2.

4. (2 - carbamoyl - 1,2 - diphenylvinyl)phenoxy lower alkanoic acid.

5. Alkali metal salt of a compound of claim 4.

6. Lower-alkyl (1 - carbamoyl - 2,2-diphenylvinyl)phenoxy lower-alkanoate.

7. Lower-alkyl (2 - carbamoyl - 1,2-diphenylvinyl)phenoxy lower-alkanoate.

8. [4 - (1-carbamoyl-2,2-diphenylvinyl)phenoxy]acetic acid.

9. [4 - (2-carbamoyl-1,2-diphenylvinyl)phenoxy]lower alkanoic acid.

10. Ethyl [4-(2-carbamoyl-1,2-diphenylvinyl)phenoxy] acetate.

11. [4-(2-carbamoyl-1,2-diphenylvinyl)phenoxy]acetic acid.

12. Lower-alkyl [1 - carbamoyl-2,2-bis(lower-alkylaminophenyl)vinyl]phenoxy acetate.

13. Ethyl 4 - [1 - carbamoyl - 2,2-bis(4-dimethylaminophenyl)vinyl]phenoxy acetate.

References Cited
UNITED STATES PATENTS 3,255,242  6/1966  Bolhofer et al. _____ 260—520

LORRAINE A. WEINBERGER, *Primary Examiner.*

A. THAXTON, *Assistant Examiner.*

UNITED STATES PATENT OFFICE
CERTIFICATE OF CORRECTION

Patent No. 3,361,790  
January 2, 1968

Robert Edward Allen et al.

It is hereby certified that error appears in the above numbered patent requiring correction and that the said Letters Patent should read as corrected below.

Column 1, lines 26 to 34 for that portion of the formula reading -C-C- read -C=C- column 4, line 52, for "2-(4-hydroxyphenyl-3" read -- 2-(4-hydroxyphenyl)-3 --; column 12, line 22, for "5.00" read -- 500 --.

Signed and sealed this 1st day of April 1969.

(SEAL)  
Attest:

Edward M. Fletcher, Jr.  
Attesting Officer

EDWARD J. BRENNER  
Commissioner of Patents